Figure 1:
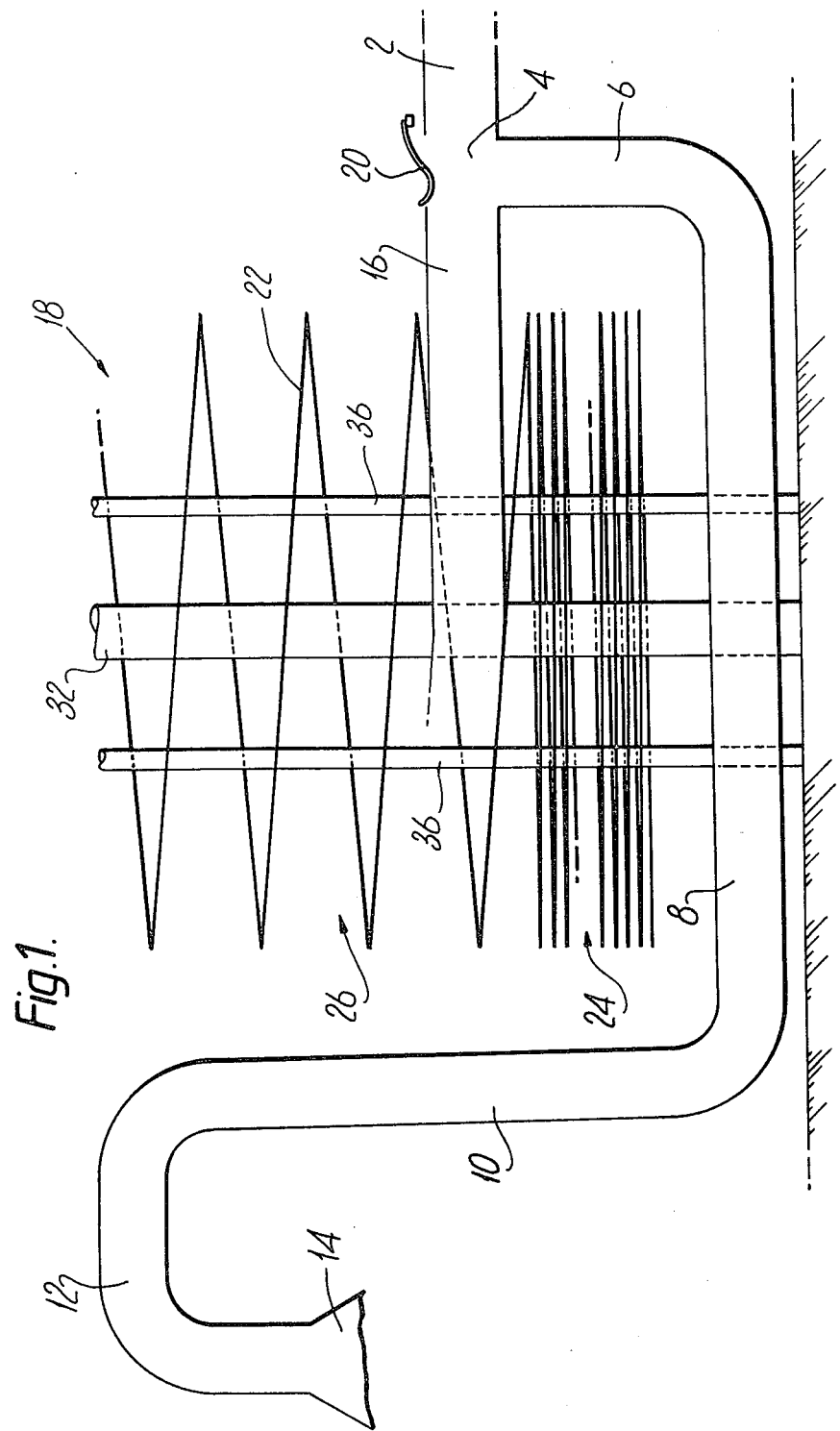

United States Patent [19]

Hinchcliffe

[11] 4,429,779
[45] Feb. 7, 1984

[54] RESERVOIR FOR ROD-LIKE ARTICLES

[75] Inventor: Dennis Hinchcliffe, London, England

[73] Assignee: Molins Limited, London, England

[21] Appl. No.: 281,330

[22] Filed: Jul. 8, 1981

[30] Foreign Application Priority Data

Jul. 17, 1980 [GB] United Kingdom ............... 8023317

[51] Int. Cl.³ .............................................. B65G 1/00
[52] U.S. Cl. .................................... 198/347; 198/778
[58] Field of Search ....................... 198/347, 778, 750

[56] References Cited

U.S. PATENT DOCUMENTS

| | | | |
|---|---|---|---|
| 2,267,970 | 12/1941 | Boal | 198/778 |
| 4,120,391 | 10/1978 | Molins et al. | 198/347 |
| 4,254,858 | 3/1981 | Seragnoli | 198/778 |

Primary Examiner—Joseph E. Valenza
Assistant Examiner—Jonathan D. Holmes
Attorney, Agent, or Firm—Antonelli, Terry & Wands

[57] ABSTRACT

A variable capacity reservoir for cigarettes or similar rod-like articles, in which an helical support surface is reversibly drivable from a storage position, in which it is compactly stored with adjacent helical turns closely spaced, to an operative position, in which adjacent helical turns are spaced apart to allow a stack of the articles to be conveyed. Pairs of pinch rollers engaging the inner edge of the strip are provided for moving the strip. The strip may be made up of a series of substantially annular sections, each of which has been severed along a substantially radial line, and with adjacent sections joined to each other in stacked formation.

11 Claims, 3 Drawing Figures

RESERVOIR FOR ROD-LIKE ARTICLES

This invention relates to a reservoir for rod-like articles and, in particular, to a variable capacity reservoir for articles of the tobacco industry such as cigarettes or cigarette filter rods.

According to one aspect of the invention a reservoir for rod-like articles includes a substantially continuous support surface defining an helically-extending path for rod-like articles in stack formation, said surface consisting of a plurality of sections connected at junctions extending generally transverse of said path. Preferably each section comprises a relatively thin strip, which may be in the form of an open-ended substantially annular disc. Such a disc may be produced from an annular disc by severing the disc along a substantially radial line. Alternatively each section could consist of part of an annular disc, e.g. half a disc produced by cutting the disc on a diameter.

Thus the support surface of the reservoir may comprise a generally flat strip of steel or plastics material made up of a series of, preferably substantially annular, sections, each of which has been severed along a substantially radial line, and with adjacent sections joined to each other in stacked formation. The strip or surface may be provided with corrugations or other projections to aid conveyance of the articles supported.

According to another aspect of the invention a reservoir for rod-like articles comprises support means having an helically-extending support surface progressively and reversibly drivable from a storage position, in which it is compactly stored with adjacent helical turns closely spaced, to an operative position, in which adjacent helical turns are spaced apart to allow a stack of rod-like articles to be conveyed, including drive means for engaging successive increments of said support means to convey it past said drive means. Preferably the drive means includes at least one friction roller engaging the surface. Preferably the support surface is formed on a relatively thin strip the inner or outer edge of which is gripped between a plurality of pairs of pinch friction rollers.

The reservoir preferably extends generally vertically with drive rollers rotatable about approximately horizontal axes. The roller or rollers may be driven from a substantially vertical drive shaft extending inside the reservoir. Substantially horizontally extending guide channels (which may be discontinuous) may be provided for the surface, at least in its operative position.

Figure 2:
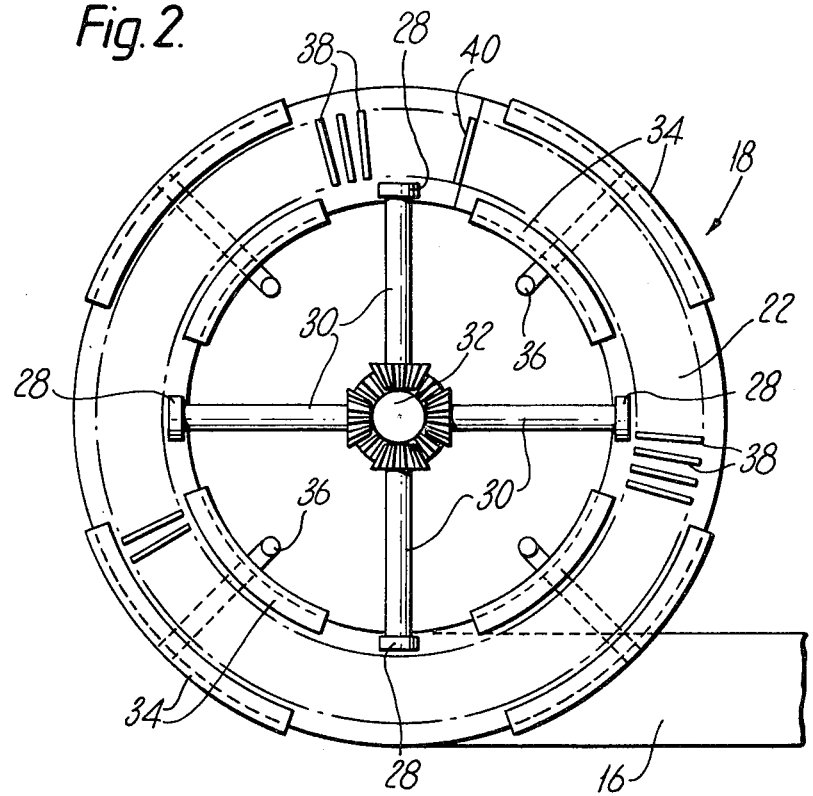
Figure 3:
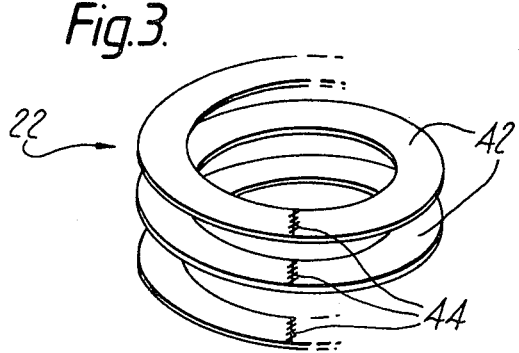

The invention will be further described, by way of example only, with reference to the accompanying diagrammatic drawings, in which:

FIG. 1 is a side view of a conveyor system for cigarettes, including a variable capacity reservoir, FIG. 2 is a plan view of the reservoir of FIG. 1, and FIG. 3 is a perspective view of a part of the reservoir of FIG. 1.

The conveyor system shown in FIG. 1 forms part of a system linking a cigarette making machine to a cigarette packing machine. The system includes a conveyor 2 along which cigarettes are moved in stack formation to a junction 4. A downdrop or chute 6 leads from the junction 4 to a low-level horizontal conveyor 8 and subsequently to an elevator 10. A short further conveyor section 12 leads from the top of the elevator 10 to a hopper 14 of the packing machine. A reversible cantilevered conveyor 16 connects the junction 4 to a variable capacity reservoir 18. A sensor 20 is positioned over the junction 4 and controls the speed and/or direction of conveyor 16. The general arrangement so far described and its control is known; for further details of construction and operation reference is directed to British Patent Specifications Nos. 1,299,174 and 1,453,191 and U.S. Pat. Nos. 4,099,608 and 4,120,391.

The reservoir 18 comprises an helical strip 22 of thin sheet material, e.g. steel or plastics. The strip 22 may be maintained in a lower compact storage position 24, with adjacent helical turns closely spaced, or may be driven upwards, past the end of conveyor 16, into an operative position 26 with sufficient spacing between adjacent turns to receive and convey a stack of cigarettes from the conveyor 16. In order to progressively advance the strip 22 from the storage position 24 to the operative position 26, and vice-versa, the strip is engaged on its inner edge between pairs of friction rollers 28, the upper roller of each pair being driven by an approximately horizontal drive shaft 30, as shown in FIG. 2. The lower roller of each pair may be an idler roller and means (not shown) are preferably provided for urging the upper and lower rollers together. The drive shafts 30 are driven from a common vertical main drive shaft 32. There may be several sets of vertically-disposed drive shafts 30 and rollers 28. The helical path of the strip 22 in the operative position 26 is additionally defined by outer and inner guide channels 34 supported by vertical posts 36.

The strip 22 may include corrugations or ribs 38 to aid traction for the cigarettes conveyed. The ribs 38 do not extend to the outer edge of the strip 22; in an alternative arrangement the strip 22 might be provided with full width ribs which engage with appropriately-adapted drive means replacing the rollers 28, so that the ribs provide traction for the strip as well as for the conveyed cigarettes. The end of the strip 22 has an upstanding plate 40 to bound the leading end of a stack in the reservoir 18.

When the reservoir 18 is empty the strip 22 lies almost entirely in the stored position 24, the plate 40 being closely adjacent the end of conveyor 16. When it is desired to load cigarettes into the reservoir 18 the strip 22 is advanced upwards, at a speed dependent on the speed of conveyor 16, so that an helically-extending stack is received on the strip 22 and advanced upwards into the reservoir. In order to unload the reservoir, when required, the strip 22 is driven in the reverse direction, also at a speed dependent on the speed of conveyor 16, which in turn is controlled by conditions at the junction 4 as sensed by the sensor 20.

The construction of the helical strip 22 is indicated in FIG. 3. Annular discs 42 are produced and cut radially at one position. Discs 42 are then joined together (e.g. by welding) by connecting one of the open ends of the disc thus formed to that of another disc stacked immediately above it and the other end to that of another disc stacked immediately below it, as indicated at 44 in FIG. 3. A plurality of such discs 42 joined together in this manner forms the required helical strip in a particularly simple and effective way. Instead of using complete discs 42 parts of discs could be used, so that the strip 22 would contain more junctions for a given length.

I claim:

1. A reservoir for rod-like articles, comprising longitudinally-rigid support means having a helically-extending support surface including a leading end for supporting a continuous stack of rod-like articles; and means for progressively and reversibly driving said support surface along a path from a storage position, in which it is compactly stored with adjacent turns closely spaced, to an operative position, in which adjacent helical turns are spaced apart to allow a stack of rod-like articles to be conveyed thereon, including a plurality of longitudinally-spaced drive means arranged along said path and engaging said support surface for feeding said support surface along said path and guide means extending between said drive means and defining said path therebetween along which said support surface is fed by said drive means, whereby said leading end and successive increments of said support surface may be reversibly engaged by and conveyed between successive drive means as said support surface is fed along said path, and so that progressively more drive means are engaged with said support surface as said surface is advanced along said path further into said operative postion.

2. A reservoir according to claim 1, wherein the support surface comprises a relatively thin strip, at least one edge portion of which is engaged by said drive means.

3. A reservoir according to claim 2, wherein said drive means comprises a plurality of pairs of rollers between which said edge portion of said strip is moved.

4. A reservoir according to claim 1, wherein the drive means includes at least one drive roller engaging said surface.

5. A reservoir according to claim 4, wherein the axis of said helically-extending support surface is substantially vertical, and said roller is rotatable about a substantially horizontal axis.

6. A reservoir according to claim 5, including a plurality of drive rollers and a common substantially vertical drive shaft drivingly connected to said rollers.

7. A reservoir according to claim 1, wherein said guide means includes a guide channel for said support surface in said operative position, said channel engaging and extending along an edge portion of said support surface.

8. A reservoir according to claim 1, wherein the surface is provided with ribs and said drive means includes means adapted to engage said ribs for driving said surface along said path.

9. A reservoir according to claim 8, wherein said ribs extend across said surface to increase traction of conveyed rod-like articles.

10. A reservoir according to claim 1, wherein said support surface consists of a plurality of sections connected at junctions extending generally transverse of said path.

11. A reservoir according to claim 1, wherein said guide means includes a plurality of guide channels for said support surface, said channels engaging and extending along an edge portion of said support surface between respective drive means.

* * * * *